United States Patent [19]

Thomey et al.

[11] Patent Number: 5,256,112
[45] Date of Patent: Oct. 26, 1993

[54] ECCENTRIC TYPE BELT TENSIONER

[75] Inventors: Henry W. Thomey, St. Clair Beach; Andrezj Dec, Windsor, both of Canada

[73] Assignee: Gates Power Drive Products, Inc., Bloomfield Hills, Mo.

[21] Appl. No.: 926,735

[22] Filed: Aug. 7, 1992

[51] Int. Cl.⁵ ................................. F16H 7/10
[52] U.S. Cl. ........................... 474/112; 474/135
[58] Field of Search ............... 474/112, 133, 135

[56] References Cited

U.S. PATENT DOCUMENTS

| | | | |
|---|---|---|---|
| 3,272,027 | 9/1966 | Wayman | 474/112 |
| 4,457,740 | 7/1984 | Olschewski et al. | 474/112 |
| 4,504,252 | 3/1985 | Honma | 474/112 |
| 4,516,962 | 5/1985 | Brandenstein et al. | 474/112 |
| 4,551,120 | 11/1985 | Thomey | 474/112 X |
| 4,571,222 | 2/1986 | Brandenstein et al. | 474/112 |
| 4,643,700 | 2/1987 | Brandenstein et al. | 474/112 |
| 4,808,148 | 2/1989 | Holtz | 474/112 |
| 4,816,012 | 3/1989 | Bytzek | 474/112 X |
| 4,824,421 | 4/1989 | Komorowski | 474/112 X |
| 4,889,520 | 12/1989 | Brandenstein et al. | 474/138 |
| 4,904,230 | 2/1990 | Kawashima et al. | 474/112 |
| 4,917,655 | 4/1990 | Martin | 474/112 |
| 4,934,987 | 6/1990 | Kadota et al. | 474/112 |
| 5,015,216 | 5/1991 | Brandenstein et al. | 474/112 X |
| 5,078,656 | 1/1992 | Brandenstein et al. | 474/112 |

*Primary Examiner*—Ramon S. Britts
*Assistant Examiner*—Roger J. Schoeppel
*Attorney, Agent, or Firm*—H. W. Oberg; S. G. Austin; C. H. Castleman

[57] ABSTRACT

A tensioner of the eccentric type with a pivot-pin and pivot bushing disposed within the confines of an inside diameter of a bearing member attached to a stub shaft, the shaft having an axially oriented groove that receives the pivot bushing. A tensioner where the pivot bushing has a wall thickness sized to receive a load from the pivot-pin and where such thickness is greater than a radial dimension between the pivot-pin and a circumference for the stub shaft.

10 Claims, 1 Drawing Sheet

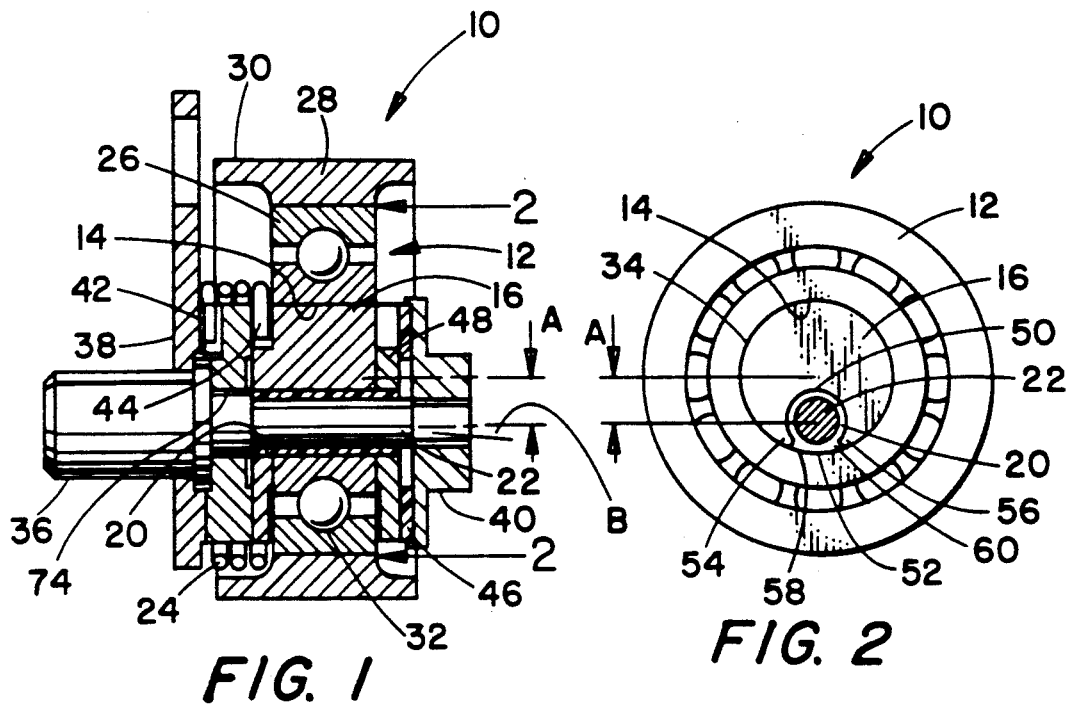
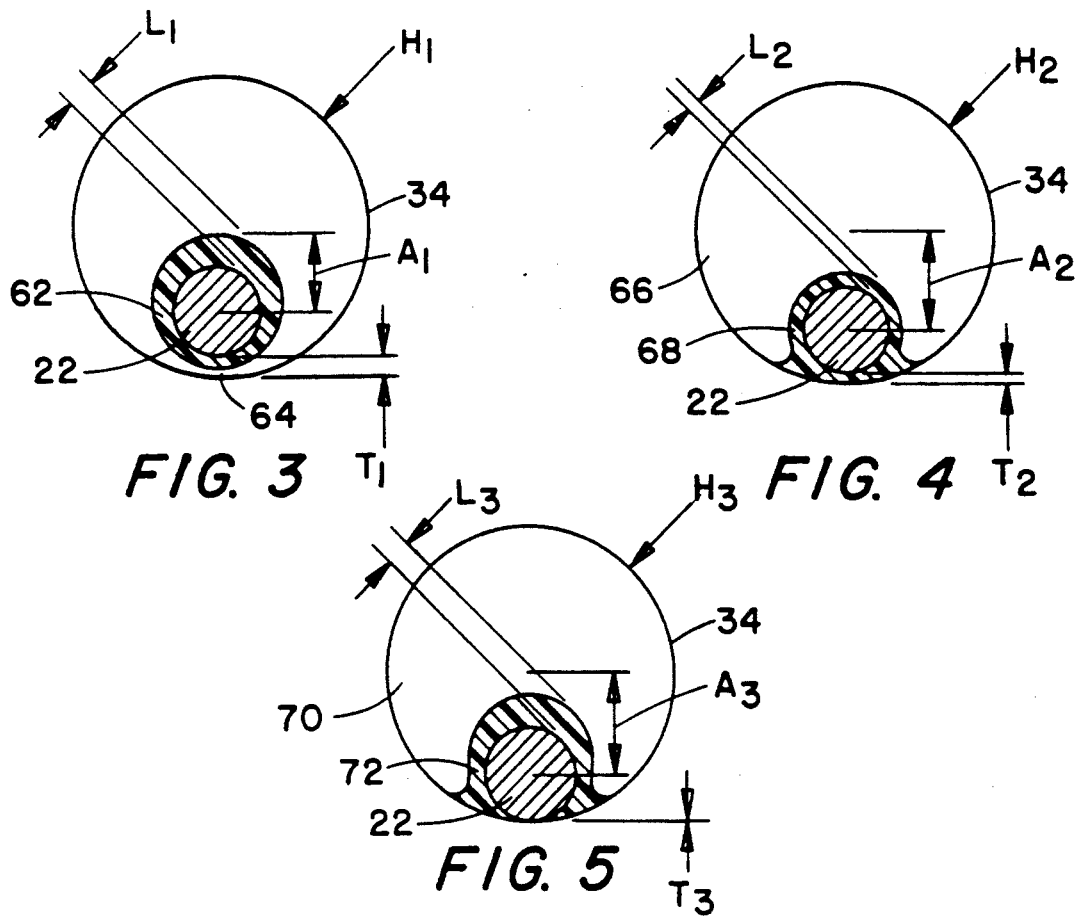

ECCENTRIC TYPE BELT TENSIONER

BACKGROUND OF THE INVENTION

The invention relates to a belt tensioner, but more particularly, the invention relates to a spring biased tensioner of the eccentric type wherein the tensioner's effective pivot arm is located within the inside diameter of a bearing.

Eccentric type tensioners may be classified in one of two general categories where in one category, elements in addition to a pivot and a pivot bushing are included within the confines defined by the inside diameter or bore of a pulley bearing. Such tensioners require a large bearing which typically includes the attendant disadvantages of higher costs and larger tensioner size as compared to tensioners having smaller sized pulley bearings. An example of an eccentric type belt tensioner falling in this category, is disclosed in U.S. Pat. No. 4,808,148.

Eccentric type belt tensioners of the second category are those which exclude additional elements other than a pivot-pin and a pivot bushing disposed within the confines of the inside diameter of a pulley bearing member and, because of this, such tensioner may be constructed with a smaller diameter bearing than those of the first category. Consequently, tensioners of the second category may be somewhat smaller than those of the first category. Nevertheless, the bearing of such tensioners may be oversized to accommodate a minimum pivot arm length within the inside diameter of the bearing which results in the bearing being oversized for the load that it must carry. An oversized bearing may result in increasing the necessary size for a tensioner as well as introducing excessive costs. An example of a belt tensioner of the second category is disclosed in U.S. Pat. No. 4,889,520.

The present invention primarily concerns belt tensioners of the latter category and makes possible the use of very small pulley bearings such as those having an inside diameter or bore of less than 25 mm. However, the features of the invention may also be used for tensioners of either category particularly where it is desirable to maximize the eccentricity of the tensioner in terms of pivot arm length.

SUMMARY OF THE INVENTION

In accordance with the invention, an eccentric type tensioner is provided that is useful in conjunction with belt drive systems and particularly those where there is limited space or where it is desirable to maximize eccentricity by increasing the pivot arm length. The invention is particularly useful to construct tensioners with smaller bearings such as those with an internal diameter or bore of 25 mm or less and more specifically, 22 mm and 17 mm.

The belt tensioner of the invention is of the eccentric type with the centers for a bearing and a pivot positioned within a diameter equal to the inside diameter of the bearing. A pivot arm is formed as a portion of a stub shaft to which the bearing is attached. A pivot bushing and a cantilevered pivot-pin extend through the stub shaft such that the pivot-pin is radially eccentric to the bearing axis. The eccentric radius defines a pivot arm length for the tensioner. A spring means biases rotation of the pivot arm about the pivot-pin.

In maximizing a tensioner's pivot arm length in accordance with a feature of the invention, the pivot-bushing and pivot-pin are positioned such that a radial dimension between the pivot-pin and the stub shaft's circumference, is from zero to substantially equal a wall thickness of the pivot bushing as sized for supporting a predetermined pivot-pin load in response to a hub load for tensioning a belt.

Another feature of the invention is a groove formed in the stub shaft for receiving the pivot-pin bushing so as to increase pivot arm length.

An advantage of the invention is that the pivot arm length for an eccentric type tensioner can be increased or maximized for all sizes of bearings. Also, the invention may be advantageously used particularly for small diameter bearings having a internal diameter of 25 mm or less.

This and other advantages of the invention will be apparent after reviewing the drawings and description thereof wherein:

FIG. 1 is the partial axial cross sectional view of a tensioner of the invention;

FIG. 2 is a sectional view taken at the head of the arrows 2—2 of FIG. 1;

FIG. 3 is an enlarged, schematical view similar to FIG. 2 but limited to the stub shaft and elements included therein and showing another embodiment of the invention;

FIG. 4 is a view similar to FIG. 3 showing another embodiment of the invention; and FIG. 5 is a view similar to FIG. 3 showing another embodiment of the invention.

DETAILED DESCRIPTION OF THE PREFERRED EMBODIMENTS

Referring to FIGS. 1 and 2, a belt tensioner 10 of the invention is provided with: a bearing 12 having an inside bore 14 at an inside diameter of the bearing; a stub shaft 16; a pivot arm 18 formed as a portion of the stub shaft 16; a pivot bushing 20; a pivot-pin 22; and a spring 24. For some applications, the outer race 26 of the bearing 12 may be used directly as a pulley member. However, and as illustrated in FIG. 1, a pulley 28 is attached to the outer race. In some instances, the pulley may be offset 30 from the center line of the bearing as, for example, from balls 32 of the illustrated bearing. It should be noted that other types of bearings may be used in practicing the invention.

The bearing is positioned with its inside bore 14 substantially at the circumference 34 of the stub shaft 16. The bearing may be attached by any desired means to the stub shaft such as by an interference fit between the bore of the bearing and the outside circumference 34 of the tub shaft.

The pivot bushing 20 and pivot-pin 22 extend through and are eccentric to the stub shaft at a radius defining a pivot-arm length A. The pin 22 is of the cantilever type and has a mounting means 36 for attachment to a nonrotatable member such as some part of an engine, not shown. The mounting means 36 may also extend through and attach a nonrotating base member 38. A fastener such as a flanged nut 40 may be used on the pivot-pin to hold the tensioner assembly together.

A spring bias means such as a torsional spring 24, has one and attached 42 to the base member such as by being bent around a tab, and another end attached 44 to the stub shaft and included pivot arm such as by bending the latter end of the spring into a receiving slot of the stub shaft. The spring biases rotation of the pivot arm about the pivot-pin which results in an eccentric movement of the bearing and pulley.

As known in the art, a damping means is typically included to inhibit rotation of the pivot arm about the pivot-pin. Any derived type of damping mechanism may be used. A damping means is illustrated in the form of a washer 46 of plastic material disposed between the flange nut 40 and a washer 48 attached to and rotatable with the stub shaft.

The feature of the invention for increasing or maximizing pivot arm length in an eccentric type tensioner, is shown in FIG. 2 and best illustrated in conjunction with FIGS. 3, 4, and 5. Referring to FIG. 2, the stub shaft has an axially oriented groove 50 extending radially inwardly from the circumference 34 of the stub shaft. The groove is sized to receive the pivot bushing such that at least a major portion of the bushing is disposed in the groove. One side of the bushing 52 abuts the bore 14 of the bearing. Preferably, the bushing is disposed in an opening bounded by the periphery of generally a "U" shaped groove 50 in the stub shaft, and a portion of the inside bore of the bearing. More preferably, the groove has rounded corners 54, 56 at the top of the "U" shaped groove and the bushing has substantially oppositely facing ear portions 58, 60 juxtaposed the rounded corners of the groove.

A range for eccentrically locating the pivot relative to the stub shaft axis is illustrated by other embodiments of the invention as depicted in FIGS. 3-5. Referring to FIG. 3, a pivot bushing 62 has a wall thickness L1 that is sufficiently sized to receive a predetermine loading from the pivot-pin 22 as induced from a hub load H1 responsive to a pulley reacting against a belt, not shown. The pivot-pin and pivot bushing are positioned relative to the stub shaft such that the radial dimension T1 between the pivot-pin and stub shaft circumference 34 is less than the thickness L1 for the bushing. As illustrated in FIG. 3, the stub shaft may be sized so that there is a radial portion 64 of the stub shaft encompassing the bearing. As shown, the thickness of the bushing 62 together with the radial thickness 64 of the stub shaft is less than the thickness L1 of the bushing. In other words, the bushing has a bore that is eccentric to its outside surface.

Referring to FIG. 4, a stub shaft 66 has an axially oriented groove extending radially inwardly from the circumference 34 and it is sized to receive a pivot bushing 68. Similar to that as explained in conjunction with FIG. 3, the pivot bushing 68 has a wall thickness L2 sufficiently sized for supporting a predetermined loading from the pivot-pin in response to a hub load H2 and wherein radial dimension between the pivot-pin 22 and circumference 34 is less than the thickness L2 of the bushing.

A maximum pivot arm length is achieved when the pivot-pin 22 is positioned substantially tangent to the circumference 34 of the stub shaft 70 as depicted in FIG. 5. Again, a pivot bushing 72 has a wall thickness L3 that is sized to receive a predetermined loading from the pivot-pin 22 in response to a hub load H3. As shown, the radial dimension between the pivot-pin and stub shaft circumference is zero. The radial dimension may be zero because the loading at the pivot-pin is where the bushing is sized with a thickness L3 for receiving a load in a same general direction from the pivot-pin. The load is in an opposite direction from and substantially parallel to the hub load H3. Accordingly, the pivot arm length A1 of FIG. 1, A2 of FIG. 4, and A3 of FIG. 5, are substantially increased over that of the prior art.

Another feature of the invention is to maximize pivot arm length by minimizing the diameter of the cantilever pivot-pin 22. Referring again to FIG. 1, the pivot-pin 22 must be sized to receive a predetermined load as so induced a hub load from a belt being tensioned. The diameter of the pivot-pin may be substantially reduced by having the pivot-pin diameter substantially at a minimum as it extends through the pivot bushing, and stub shaft provided that the movement of inertia of the pin is substantially increased by some means directly adjacent to the stub shaft. As illustrated, one way of doing this is to increase the diameter to a larger diameter 74 adjacent to the bearing and stub shaft.

Another feature of this invention is to compensate for any offset loading as may be induced from a pulley 28 being offset 30 as shown. Such an offset will induce a tipping action on the pulley as the bearing rocks around its tolerance limits. Such rocking is approximately up to three-tenths of a degree. To adjust for such tipping, the pivot-pin may be offset in angle B of up to three-tenths of a degree of the angle that is substantially in the same plane as that for the bearing when it is tipped.

To illustrate the features of the invention, a tensioner having a bearing with a 17 millimeter bore was used in conjunction with a stub shaft having substantially a 17 mm diameter. A pivot-pin was sized with a first axial portion extending through the stub shaft and with a diameter of 5 mm. A second axial portion of the pivot-pin included a larger diameter of 6.5 mm as a means for increasing the movement of inertia of the pivot-pin. The 5 mm diameter portion was designed for a bending stress of 23,000 psi±11,500 psi, considering fatigue, and responsive to a nominal belt tension of 50 lbs. The pivot bushing was sized to receive a load from the pivot-pin whereas the wall thickness for supporting the load was substantially 1 mm and the radial distance between the pivot-pin and circumference of the stub shaft was substantially 0.5 mm. A workable pivot-arm length of 5.5 mm was achieved.

The foregoing detailed description is made for the purpose of illustration only and is not intended to limit the scope of the appended claims.

What is claimed is:

1. In a tensioner of the type with a bearing having an inside bore and positioned substantially at a circumference of a stub shaft, a pivot arm formed as a portion of the stub shaft, a pivot bushing and cantilevered pivot-pin extending through and eccentric to the stub shaft at a radius defining a pivot arm length, and a spring means for biasing rotation of the pivot arm about the pivot-pin, the improvement comprising:

the pivot bushing having a wall thickness sufficiently sized for supporting a predetermined loading from the pivot-pin and wherein the pivot-bushing and pivot-pin are positioned relative to the stub shaft such that the radial dimension between the pivot-pin and stub shaft circumference is from zero to substantially equal said wall thickness of the pivot bushing.

2. The tensioner of claim 1 wherein the stub shaft has an axially oriented groove extending radially inwardly from the circumference and sized to receive the pivot bushing and wherein a portion of the pivot bushing is disposed in the groove.

3. The tensioner of claim 2 wherein the groove has generally a "U" shape when the stub shaft is viewed in tansverse cross-section.

4. The tensioner of claim 3 wherein the pivot-bushing has a portion disposed in an opening bounded by the periphery of the "U" shape groove and a portion of the inside bore of the bearing.

5. The tensioner of claim 4 wherein the groove has rounded corners at the top of the "U" shape and the pivot bushing has substantially oppositely facing ear portions juxtaposed the rounded corners.

6. The tensioner of claim 5 wherein the pivot bushing includes a flange that defines a means for positioning the pivot bushing in relation to the stub shaft.

7. The tensioner of claim 1 and further including a pulley attached to the bearing, the pulley having an offset to one side in relation to the bearing, and wherein, the bearing is subject to rocking a predetermined amount resulting in tipping of the pulley, and wherein, the pivot-pin is offset an angle to compensate for such rocking.

8. In a tensioner of the type with a bearing having an inside bore and positioned substantially at a circumference of a stub shaft, a pivot arm formed as a portion of the stub shaft, a pivot bushing and cantilined pivot-pin extending through and eccentric to the stub shaft at a radius defining a pivot arm length, and a spring means for biasing rotation of the pivot arm about the pivot-pin, the improvement comprising:

the stub shaft having an axially oriented groove extending radially inwardly from the circumference and sized to receive the pivot bushing and wherein a portion of the pivot bushing is disposed in the groove.

9. The tensioner of claim 8 and further comprising:
the pivot-pin with a first axial portion extending through the stub shaft and with a first diameter substantially sized for a predetermined cantilevered load, and with a second axial portion with at least a second, larger diameter as a means for increasing a moment of inertia of the pivot-pin and supporting the first axial portion.

10. In a tensioner of the type with a bearing having an inside bore and positioned substantially at a circumference of a stub shaft, a pivot arm formed as a portion of the stub shaft, a pivot bushing and cantilined pivot-pin extending through and eccentric to the stub shaft at a radius defining a pivot arm length, and a spring means for biasing rotation of the pivot arm about the pivot-pin, the improvement comprising:

the pivot-pin with a first axial portion extending through the stub shaft and with a first diameter substantially sized for a predetermined cantilevered load, and with a second axial portion with at least a second, larger diameter as a means for increasing a moment of inertia of the pivot-pin and supporting the first axial portion.

* * * * *